United States Patent [19]
Franko et al.

[11] 3,753,779
[45] Aug. 21, 1973

[54] METHOD OF MAKING ZINC ELECTRODES
[75] Inventors: John Franko, New York; William J. Ryan, Bethpage, both of N.Y.
[73] Assignee: Leesona Corporation, Warwick, R.I.
[22] Filed: June 14, 1968
[21] Appl. No.: 736,952

[52] U.S. Cl. .................. 136/31, 136/126, 204/130
[51] Int. Cl. .......................................... H01m 43/02
[58] Field of Search ....................... 136/30, 31, 125, 136/126, 120; 204/55, 114, 115, 130

[56] References Cited
UNITED STATES PATENTS

| | | | |
|---|---|---|---|
| 1,127,911 | 2/1915 | Morey | 75/.5 |
| 3,368,925 | 2/1968 | Denison et al. | 136/126 |
| 3,493,434 | 2/1970 | Good Kin | 136/125 X |
| 2,640,864 | 6/1953 | Fischbach et al. | 136/30 |
| 2,880,258 | 3/1959 | Pucher et al. | 136/30 |
| 2,865,974 | 12/1958 | Scheuerle et al. | 136/30 |
| 3,440,098 | 4/1969 | Stachurski | 136/141 |
| 2,820,077 | 1/1958 | Salauze | 136/31 |
| 3,069,486 | 12/1962 | Solomon et al. | 136/125 X |
| 3,071,638 | 1/1963 | Clark et al. | 136/126 X |
| 3,261,715 | 1/1966 | Solomon et al. | 136/125 X |
| 3,378,406 | 4/1968 | Rosansky | 136/86 |

*Primary Examiner*—Winston A. Douglas
*Assistant Examiner*—M. J. Andrews
*Attorney*—Alfred W. Breiner

[57] ABSTRACT

Improved anodes comprising dendritic zinc suitable for use in electrochemical devices such as primary and secondary cells and methods for preparing the anodes are disclosed. These methods are: (1) coating a porous support with, or shaping an electrode from already-prepared zinc dendrites; (2) in situ reduction of a porous substrate coated with a zinc compound; and (3) electrodeposition of zinc dendrites from a solution of a zinc compound onto a porous support. The above methods include various washing steps which prevent side reactions between the zinc dendrites and other substances which may be present during the production and use of the anodes. Various molding and shaping steps may also be included, and in situ amalgamation, or amalgamation of the finished anodes is generally desirable. These anodes have unusually high surface area, porosity and efficiency.

5 Claims, No Drawings

METHOD OF MAKING ZINC ELECTRODES

FIELD OF THE INVENTION

This invention relates to an improved zinc anode for use in electrochemical devices such as primary and secondary cells, and a method of preparing the anode. More particularly, this invention relates to a porous zinc anode with high surface area comprising dendritic zinc optionally containing a small amount of mercury. The zinc dendrites, obtained by various means, are pressed, rolled or molded into a thin structure having two large major surfaces, or shaped in place upon a porous support to form the desired anode structure.

DESCRIPTION OF THE PRIOR ART

The use of zinc or zinc amalgams in electrochemical cells has been known since the discovery of the voltaic cell. Since that time, zinc has been widely used as an anode in both primary and secondary (storage) cells. Its high level of chemical reactivity, its availability and its low cost have all contributed to the development of its extensive use. A wide variety of primary cells; such as, the Edison-LaLande, Laclanche, mercuric oxide, silver chloride, Bunsen, Clark, Daniell, Fuller and Grove cells are examples of electrochemical devices that employ zinc or amalgamated zinc as an anode. The Drumm-type (zinc/nickel oxide) cell is an example of a secondary or storage cell employing a zinc anode. The Main Cell and certain types of air-depolarized zinc/air batteries can be either primary or secondary cells. Silver/zinc secondary cells are also known.

Generally speaking, the prior art cells employing zinc anodes are fairly light in weight and produce good open-circuit voltages, but are not capable of withstanding high current drains for long periods of time. Very recently, increased attention has been focused upon the possibility of developing electrochemical cells and batteries which can, unlike the known batteries employing zinc anodes, also meet stringent current and capacity requirements. Various methods have been proposed in the prior art for improving the performance of zinc as an electrode material by increasing its surface area. Among these methods are: first, combining zinc with a dissolvable material, forming an anode structure therefrom, and treating this structure with a solvent for the dissolvable material such that a porous zinc anode is produced; and second, subjecting zinc powder to mechanical pressure such that a more highly porous zinc electrode is produced. Nevertheless, a primary or secondary cell employing a practical, reproducible zinc anode which can consistently provide the high current densities needed for many of the currently contemplated uses of electrical energy, e.g., in the aeronautical, space and automotive fields has yet to be made.

OBJECTS OF THE INVENTION

Accordingly, it is an object of this invention to provide a porous zinc anode of high surface area.

Another object of this invention is to provide a method for using zinc dendrites in an anode for an electrochemical cell.

A further object of this invention is to improve the performance of electrochemical cells, batteries and the like, employing zinc anodes.

Still another object of this invention is to provide a method for producing zinc dendrites from reduction of an alkaline solution saturated with zinc oxide wherein the dendrites, when used as an electrode material, will not enter into undesirable side reactions with an electrolyte, a porous supporting substrate, and/or gases dissolved in, produced by or introduced into the electrolyte.

A still further object of the invention is to provide a porous, high surface area zinc anode which has a long shelf life, supplies a high current density, performs at high efficiency, has improved reproducibility and better conforms to quality control standards.

GENERAL DESCRIPTION OF THE INVENTION AND ILLUSTRATIVE EXAMPLES

The above objects are achieved by making a zinc anode according to one of the following methods:

First method: Coating a porous support with or shaping an electrode from already-prepared dendrites.

In this method, zinc dendrites are plated onto an electrically conductive container, collected, and washed free of all residues of the plating solution or suspension. The dendrites are ground to a fine size and rewashed. The finely divided dendritic zinc is then molded into suitable shape having two relatively large major surfaces, e.g., a flat plate, or molded in place on an electrically conductive porous support, e.g., a flat piece of metal gauze, mesh or screen. The resulting structure can be wrapped in a porous membrane and rolled in a rolling mill as part of the molding or shaping process. If an amalgamated zinc electrode is desired, the amalgamation can be carried out before or after the molding step.

Second method: In situ reduction of a porous substrate coated with a zinc compound.

In this method, an electrically conductive porous support is coated with a zinc compound, such as zinc oxide. The coated substrate is first wrapped with a porous membrane, or if the zinc compound is sufficiently adherent, placed directly in a reducing medium comprising an ionizable liquid, such as, an aqueous solution of an alkali metal hydroxide or an alkali metal hydroxide saturated with a zincate salt. After the zinc compound in the electrode assembly has been reduced, the electrode may be amalgamated. Various washing, drying, pressing, molding or rolling steps can be applied to produce the finished electrode.

In another embodiment of this method, the zinc compound contains zinc dust, which serves as a nucleating agent during the reduction step.

In still another embodiment of this method, the zinc compound can be mixed with a small amount of mercuric oxide.

Third method: Electrodeposition on a porous support.

In this method, the electrically conductive porous support serves as the cathode in a reduction cell containing a liquid ionizable medium and a zinc compound dissolved in the liquid medium. Zinc dendrites of the mossy morphology are plated on to the support. The support, with the dendrites plated to it, is quickly washed with distilled water or the like and placed in a distilled water bath through which an inert or unreactive gas, such as, nitrogen, helium, argon, or the like is bubbled. The resulting electrode structure may be further shaped and molded. At this point, the electrode may be amalgamated.

In any of the above methods, zinc dendrites, whether separate from or included in an electrode structure, because of their high reactivity, are preferably stored under an inert liquid to prevent the zinc from reacting with moisture or other impurities in the atmosphere. The preferred method of storing the zinc dendrites is to use an inert, water-miscible, organic liquid, such as methanol; but, generally, any substance which protects the zinc can be used. The substance need not be a hydrophilic liquid, so long as any hydrophilic liquid that is used is removed from the surface of the zinc prior to using the zinc electrode in a cell employing an aqueous electrolyte.

A particularly desirable feature of the above methods is that the possibility of side reactions between the zinc dendrites, an electrolyte, the porous support material, and any gases which may be present, such as hydrogen and dissolved air are prevented. It has been discovered that dendritic zinc is a highly reactive material; and, accordingly, one of the problems overcome by this invention is the avoidance of such side reactions while at the same time realizing all the advantages of performance embodied in such a highly activated form of zinc.

The skilled technician will recognize that a variety of rolling, pressing and molding steps could be used in connection with the methods of this invention. For example, the porous substrate can be eliminated and the zinc dendrites can be molded into a suitable shape for use as an integral electrode assembly. The theoretical explanation for the high efficiency of the electrodes of this invention is by no means clear; however, it is believed that the electrolyte of an electrochemical cell contacts the surface of an anode of this invention over the entire pine tree shape or the like of the dendrites, thus effectively increasing the reactive surface area. Therefore, the exact shape of the anode and its porous support, if any, and the nature of the electrolyte and the cathode of the cell in which it is employed are not critical to the invention. Thus, the anodes of this invention can be used in virtually any electrochemical cell employing a zinc anode, for example, the air-depolarized cell (zinc/air cell) of the type described in Oswin co-pending application Ser. No. 533,516 filed Mar. 11, 1966, the Laclanche cell, the Edison-Lalande cell, the Drumm-type secondary cell, the Main primary or secondary cell, the mercuric oxide cell, the Poggendorf cell, the silver chloride cell, the Bunsen cell, the Clark cell, the Daniell cell, the Fuller cell, the Grove cell, and the like.

Any of the prior art cathodes can be used to form an electrochemical cell using the anodes of this invention. Such cathodes comprise carbon, carbon mixed with various oxides, nickel oxide, metals of Group IB of the Periodic Table and salts of these metals, mercuric oxide, lead dioxide, mercury, platinum and other Group VIII metals of the Periodic Table, and catalytic membranes comprising metals and/or metal oxides of the transition series and/or alloys thereof, e.g., Group VIII and Group IB metals and alloys. Generally, any metal, metal oxide, metal salt or the like may be used, depending upon the performance characteristics desired and the relevant economic factors, such as the cost and the availability of the cathodic material. The use of a catalytic membrane as a surface upon which an oxidant gas, such as air can be reduced to hydroxide ion or the like is a desirable type of cathode, since the membrane is not consumed and since a theoretically unlimited supply of air is available. The advantages of the present anodes, as a result of their high reactivity, however, is most fully realized when employing the extremely efficient cathodes of the type noted in the aforesaid Oswin application Ser. No. 533,516.

Electrolytes used with the aforementioned cells can be virtually any ionizable fluid, including acids, bases, salts, oxides and the like, which may be diluted with or dissolved in polar fluids, such as water, ammonia and the like. Among the suitable electrolytes are aqueous alkali metal hydroxides and/or mixtures of such hydroxides with alkali metal zincates, sulfuric acid, phosphoric acid, nitric acid, ammonium chloride and ammonium chloride mixed with zinc chloride, potassium dichromate and potassium dichromate mixed with an acid, alkali metal halides, copper sulfate and sulfates of Groups IIA, IIB, and IA of the Periodic Table, and the like. The electrolyte can be a pourable liquid or may be a paste containing water or some other polar liquid and a filler such as a clay. Electrolytes comprising an anolyte and a catholyte can also be used.

The dendritic zinc used to formulate the anodes of this invention can be mixed with other materials to provide a more lightweight anodic material or the like. Such other materials are, for example, relatively inert polymers, such as the polyhaloalkylene resins. The dendrites formed in the above-described methods can be produced by the electrolysis of virtually any dissolved zinc compound, i.e., a compound which produces zinc or zincate ions or zinc ammonia or zinc-cyanide ionic complexes and the like when dissolved in a polar fluid. A preferred zinc compound is zinc oxide (ZnO) which occurs abundantly as "zincite," and, thus, is inexpensive and readily available. Zinc oxide dissolves fairly easily in strong alkalis such as alkali etal hydroxides and forms a zinc dendrite structure upon electrolysis and electrodeposition upon a cathodic surface. For the most economical results, saturated solutions of zinc oxide are used, and zinc oxide pastes or slurries are particularly desirable. However, clear solutions of zinc oxide or other zinc compounds in solutions of alkali metal hydroxides or the like can be used.

The amalgamation, if utilized, can be performed in any suitable manner, depending upon the stage of the preparation of the electrode at which the mercury is incorporated. If amalgamation is desired simultaneously with the formation of dendrites, the zinc can be codeposited electrolytically with mercury. In this method, a small amount of a mercury compound is dissolved with the zinc compound prior to the formation of the dendrites. If the dendrites are already formed, metallic mercury will amalgamate with the metallic zinc at room temperature as is known and practiced in the prior art.

The porous substrate used for support and current collection is not an essential feature of this invention but greatly facilitates the use of the second and third methods outlined above. The substrate should be electrically conductive and should preferably comprise a relatively unreactive metal, since zinc, particularly in the form of dendrites, is a highly reactive metal. By relatively unreactive metal is meant metals of the electromotive series standing below zinc in activity and preferably below hydrogen in activity. Examples of the former are tin, lead, metals of the first triad of Group VIII of the Periodic Table, and alloys of these. Examples of the latter are metals and alloys of Groups IB and VIII, second and third triads, of the Periodic Table, as well as the elements of a metallic nature of Group VA of the Periodic Table. A solid, porous carbon structure formed from graphite or amorphous carbon with or without fillers may also be used.

The following examples illustrate the principle and practice of this invention, and are not intended to be limiting in scope. Parts are by weight, unless indicated otherwise.

EXAMPLE I

A stainless steel receptacle was placed in a reducing tank containing a 10 wt. percent solution of potassium hydroxide saturated with zinc oxide. A terminal strip soldered on to the receptacle was electrically connected to the negative terminal. The current was set to 0.16 amperes/square inch for 20 hours. At the end of the reduction period, the power supply was shut off, the terminal strip was disconnected, and the receptacle, containing zinc dendrites plated on its exposed surfaces, was removed from the reducing tank. The dendrite clumps were gently dislodged and scraped off into a 5-liter Pyrex beaker and rinsed with distilled water at least four times. The rinsed dendrite clumps were then transferred to a one liter beaker containing distilled water and this beaker was placed in an ultrasonic cleaner for five minutes. The dendrite clumps were again washed several times until repeated tests with indicator paper showed an absence of alkalinity. At this point, the dendrites appeared to be free of potassium zincates, zinc oxide and potassium hydroxide. The dendritic zinc was then ground until the resulting fine powder could pass a 325 mesh (Tyler scale) screen. The screened dendritic powder was transferred to another one liter beaker and washed with distilled water. The powder was then dried in a vacuum oven at room temperature using a cold trap to remove water vapor. The vacuum dried powder was stored under methanol until ready for further use. A piece of silver screen or gauze (Exmet 3Ag 6-3/0) was cut to size. A 10 mil thick silver terminal strip was spot welded to the silver screen. The screen was placed in a stainless steel die, and the dendritic zinc powder was measured and poured on to the screen and pressed down with a spatula. After forming a coating of zinc on one side of the screen in this manner, the screen was inverted and the same procedure was followed on the other side. A piece of separator paper was cut to size, and a slot was cut for the terminal strip. The paper was then folded over the coated screen, and the entire assembly was carefully compressed with a stainless steel die in a rolling mill, starting at the end not having the terminal strip and pressing every 1/4th inch up to and ending at the terminal strip. The assembly moved from the rolling mill was a dendritic zinc plate suitable for use as an anode. After removal of the separator paper, the zinc surface of the anode assembly was amalgamated with metallic mercury in the conventional manner. The amalgamated electrode was stored under methanol until used in a zinc/air battery.

EXAMPLE II

A piece of silver screen was cut to size and spot welded with a silver terminal as in Example I. Separator paper was cut to size and a slot cut for the terminal strip. Approximately 3.5 grams of zinc oxide was weighed out, and the screen and separator paper were also weighed. The soldered terminal lead was inserted through the paper, and the paper was folded around the screen such that the fuzzy side was in contact with the screen. The paper was then folded back to expose one side of the screen, and the screen and paper were placed in a stainless steel die, screen facing upward. The pre-weighed oxide was carefully poured onto the screen, and 2.8 milliliters of water were added to make a thick slurry. The slurry was spread so as to form a uniform layer across the surface of the screen. The paper was then folded over the slurry bottom first, then top, and then sides. The resulting assembly was removed from the die, placed on a zinc sheet, folded sides downward, and placed in a drying oven for 1 hour at 50° C. The assembly was then removed from the drying oven and placed into a reducing tank horizontally, the silver terminal strip lead being connected to the negative terminal bar. An aqueous solution of 5 wt. percent potassium hydroxide is added in the amount of 115 mls. per square inch to be reduced. The assembly was covered with additional separator paper to prevent the dried slurry coating on the silver screen from rising during the reduction process. The current used for reduction was 0.16 amps/in$^2$ for 20 hours. After reduction, the power supply was shut off, the separator paper cover was removed, the silver terminal strips were disconnected from the negative terminal bar, and the dendritic zinc plate electrode assembly was placed in a 5-liter Pyrex beaker and washed at least four times with distilled water. The washed anode was placed in a 1-liter Pyrex beaker containing distilled water. The beaker was placed in an ultrasonic cleaner for 5 minutes, removed, and the electrode again washed. The ultrasonic cleaning/wash cycle was repeated until an indicator paper test showed a lack of alkalinity. As in Example I, the anode appeared to be free of potassium hydroxide, potassium zincate, and zinc oxide at this point. The anode was then carefully compressed with a stainless steel die in a rolling mill as in Example I, removed from the mill, and placed in a vacuum oven at room temperature using a cold trap to remove water. After slightly less than 200 microns pressure was reached, the anode was removed and the weight of zinc was calculated. The finished anode was then stored as in Example I.

EXAMPLE III

The method of Example II was repeated with one exception: instead of weighing out 3.5 gms. of zinc oxide, 2.4 gms. of zinc oxide and 0.8 gms. of zinc dust are weighed out, carefully poured on to the silver screen and mixed with 2.5 mls. of water to form a thick slurry. The particles of zinc dust in the slurry served as nucleating agents for the formation of zinc dendrites during the reduction step.

EXAMPLE IV

The procedure of Example II was followed with the exception that 0.01 gms. of mercuric oxide was mixed into the aqueous slurry that was spread on to the silver screen. During the reduction step, metallic mercury was formed and co-deposited with the dendritic zinc to form an amalgamated electrode material.

EXAMPLE V

A silver support screen was prepared as in the above examples. A potassium hydroxide solution saturated with zinc oxide was prepared as in Example I, and, also, as in Example I, was placed in a reduction cell. The silver support substrate with soldered terminal strip was placed in the cell, and the terminal strip was connected to the negative terminal bar of the cell. The current was set to 0.16 amps./square inch. Twenty hours later the power supply was shut off, and the silver support screen was removed from the cell. It was observed that zinc dendrites of the mossy morphology were plated on to the support. Immediately after removal from the reduction cell, the support screen with dendrites plated to it was placed directly into a 5-liter Pyrex beaker filled with distilled water. The screen-and-dendrite electrode assembly was then washed at least four times. The electrode assembly was then placed in a distilled water bath through which nitrogen gas was bubbled. The electrode was left in the bath for at least 15 minutes. At the end of this treatment, the electrode appeared to be free of absorbed hydrogen, since no side reactions involving the zinc dendrites and the silver support screen were observed. The electrode was then wrapped in separator paper and rolled as in Example I. Amalgamation was also carried out as in Example I.

EXAMPLE VI

Six sample zinc anodes were made in accordance with the method of Example IV. In each case, approximately 35.0 gms. of zinc oxide and 0.10 gms. of mercuric oxide were employed in the slurry. Upon weighing the finished electrodes and calculating the amount of zinc contained therein, it was found that the zinc load varied from 25.1 gms. to 26.6 gms. In addition, the thickness, volume, percent porosity, and percent efficiency of the sample electrodes were measured. The results were as follows:

VOLUME

| Sample No. | Zn Load (gm.) | Thickness (inch) | (cm$^3$) | % Porosity | % Efficiency |
|---|---|---|---|---|---|
| 1 | 26.63 | 0.039 | 0.101 | 77.5 | 67.4 |
| 2 | 25.80 | 0.038 | 0.099 | 77.7 | 67.0 |
| 3 | 26.37 | 0.038 | 0.099 | 77.2 | 64.9 |
| 4 | 25.99 | 0.038 | 0.099 | 77.5 | 73.1 |
| 5 | 25.75 | 0.038 | 0.099 | 77.8 | 67.1 |
| 6 | 25.10 | 0.038 | 0.099 | 78.3 | 69.1 |

It can be seen from the above examples that methods have been found for producing an unusually efficient zinc anode having excellent reproducibility and quality control.

EXAMPLE VII

An air battery was constructed comprising a porous zinc anode fabricated as set forth in Example I and wrapped with fiber-reinforced cellulose and a composite cathode comprising a polytetrafluoroethylene membrane in intimate contact with a conductive nickel screen and a layer of uniformly mixed polytetrafluoroethylene particles and platinum black. The loading of platinum in the catalytic layer was approximately 7 mgs. platinum per cm$^2$ of the cathode surface. The catalytic layer of the cathode was in intimate contact with the reinforced cellulose wrapped around the anode. The cellulose wrap was impregnated with 28 percent aqueous potassium hydroxide electrolyte solution. The unit was sealed from the top to provide a fluid-tight cell. The cell when subjected to continuous charge and discharge cycles for a total of 20 cycles, with the charging being carried out at a current density of 35 milliamps per cm$^2$ geometric surface area of the zinc and the current applied by the pulsing technique 10 milliseconds on and 20 milliseconds off, gave no noticeable deterioration in performance.

Many variations in the method are possible without departing from the basic principles embodied in these methods. Generally, any method for producing zinc dendrites which renders them sufficiently free of absorbed hydrogen, electrolytes and the like such that they are passive enough to be worked and fashioned into an electrode structure is within the scope of the invention. Thus, it is not necessary to use a substrate or other current collecting and/or supporting members to fashion the electrode, provided, of course, that the dendritic zinc is sufficiently passive or free of contaminants to be molded, shaped, compressed and the like. The zinc anodes of this invention are highly efficient with and without amalgamation. If amalgamation is used, the amount of mercury employed is not critical. It has been found that minor amounts as low as 0.05 percent are helpful, and as much as 10 percent might be used, although much smaller amounts also result in improved performance. In view of the high cost of mercury, the preferred range is 0.1–1 wt. percent metallic mercury, which corresponds to a weight percent range of roughly 0.11–1.1 percent mercuric oxide. If zinc dust is incorporated into the zinc oxide mixture, as in Example III, as little as 1 wt. percent provides nucleation, and as much as 50 wt. percent can be used without interfering with dendrite formation. The preferred ratio is 10–30 parts by weight of zinc dust per hundred parts by weight of zinc oxide.

As pointed out above, many dissolved zinc compounds are suitable for electrode deposition of zinc dendrites. Among these are zinc sulfide, alkali metal and alkaline earth metal salts of zinc tetracyanide, alkali metal and alkaline earth metal zincates, zinc carbonate, zinc halides, halides of the zinc tetraammonia complex, zinc hydroxide, zinc oxysulfide, and the water soluble zinc salts such as zinc sulfate, zinc acetate and the like. In the case of the water soluble zinc salts, the preferred method of forming dendrites is to plate out zinc from an aqueous solution on to a porous support or on to a receptacle for collection.

The temperature at which a slurry of zinc oxide or other zinc compound is dried upon a porous support is not critical, but 50°–70° C. for one hour is preferred. Longer times could be used with temperatures down to room temperature, and shorter times could be used with temperatures up to 95° C. Temperatures still lower than room temperature may be used in connection with a cold trap for moisture and a vacuum of from 1 mm. down to 100 microns of mercury. The vacuum method is the referred method for removing the last traces of moisture in a rolled electrode.

The zinc compound and the electrolytic reducing conditions used to produce dendrites for use with this invention are not highly critical. A current of from 3 mA/Cm$^2$ to at least 1 amp/Cm$^2$ are satisfactory. The selection of the current density and the duration of the reduction period varies with electrode spacing, concentration of plating bath and the quantity of zinc to be plated. The condition of, and duration of the reduction period, therefore, with the above guides, can be determined by one skilled in the art.

Many other variations and modifications of this invention could be made without departing from its scope. The true scope of the invention is to be determined from the claims which follow.

What is claimed is:

1. A method of making a zinc anode containing high surface area dendritic zinc comprising the steps of (1) providing a porous conductive substrate having terminal means for applying an electrical current thereto; (2) providing a separator paper around said porous substrate but leaving said terminal means uncovered; (3) applying an aqueous slurry of a zinc compound to and around said porous substrate while retaining said zinc compound within said separator paper; (4) closing said separator papers to retain and hold said zinc compound in contact with said substrate; (5) drying the assembly of step 4; (6) inserting said dried assembly into a reducing tank containing an ionizable liquid; (7) applying an electrical current to said terminal means and maintaining said current at a current level and potential to reduce said zinc compound to high surface area dendritic zinc; (8) removing said separator paper; (9) washing said assembly until free from alkalinity; and (10) forming said assembly into the desired anode form.

2. The method according to claim 1 wherein a minor amount of zinc dust is mixed with the zinc compound.

3. The method according to claim 1 wherein a minor amount of mercuric oxide is mixed with the zinc compound.

4. The method according to claim 1 wherein the zinc compound is zinc oxide.

5. The method according to claim 1 wherein said substrate is porous and is coated in an electrochemical reduction cell, said substrate being the cathode of said cell during said coating.

* * * * *